United States Patent [19]
Calmer

[11] Patent Number: 5,704,202
[45] Date of Patent: Jan. 6, 1998

[54] UNIVERSAL CORN PICKING ROW UNIT

[76] Inventor: Marion Calmer, 550 North Knox Rd., Alpha, Ill. 61413

[21] Appl. No.: 486,698

[22] Filed: Jun. 7, 1995

[51] Int. Cl.⁶ .................................................. A01D 45/02
[52] U.S. Cl. ................................................. 56/106; 56/93
[58] Field of Search .................................. 56/106, 93, 82

[56] References Cited

U.S. PATENT DOCUMENTS

| | | |
|---|---|---|
| Re. 27,554 | 1/1973 | Ashton et al. . |
| Re. 31,063 | 10/1982 | Greiner et al. . |
| Re. 31,064 | 10/1982 | Shriver . |
| 1,456,569 | 5/1923 | Reece et al. .................. 56/82 |
| 2,264,565 | 12/1941 | Coultas et al. ............. 56/106 X |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,462,928 | 8/1969 | Schreiner et al. . |
| 3,496,708 | 2/1970 | Bornzin . |
| 3,520,121 | 7/1970 | Ashton et al. .................. 56/106 |
| 3,528,233 | 9/1970 | Martner et al. . |
| 3,528,234 | 9/1970 | Kowalik et al. . |
| 3,585,789 | 6/1971 | Blanshine et al. ............. 56/106 X |
| 3,599,409 | 8/1971 | Whitney et al. . |
| 3,646,737 | 3/1972 | Grant ............................. 56/106 |
| 3,818,685 | 6/1974 | Stoessel et al. . |
| 3,831,356 | 8/1974 | Maiste et al. ................. 56/106 X |
| 3,885,375 | 5/1975 | Solterbeck ................... 56/106 X |
| 4,115,983 | 9/1978 | Barnes et al. . |
| 4,333,304 | 6/1982 | Greiner et al. . |
| 4,434,606 | 3/1984 | Rhodes et al. ................. 56/106 |
| 4,531,351 | 7/1985 | Sousek . |
| 4,598,535 | 7/1986 | Sousek . |
| 4,771,592 | 9/1988 | Krone et al. . |
| 5,528,887 | 6/1996 | Nagy et al. . |

FOREIGN PATENT DOCUMENTS

| | | | |
|---|---|---|---|
| 2725336 | 12/1978 | Germany ............... | 56/106 |

OTHER PUBLICATIONS

Alan C. King, "An Informal History—Allis–Chalmers—Tractor Division—Milwaukee, U.S.A.—1918–1960", p. 31 1989.

"Operators Manual—Setting Up Instructions—McCormick 34HM–21, Corn Snapper (Two Row, Mounted Type)", International Harvester Company, pp. 14–15, 22–23, 50–51, 58.

"Instruction Manual and Parts List"—Snapping Unit Frame Field Improvement Parts for McCormick–Deering—No. 14P; No. 24 Corn Pickers—International Harvester Co., pp. 2–8.

"CP–8 McCormick Parts Catalot—34HM–20 Corn Picker; 34HM–21 Corn Snapper; 34HM–22 Sweet corn Picker (Two–Row, Mounted–Type)", International Harvester Company, pp. 1, 34–25, 40–41, 44–45, 48–49.

©1994 U.S. Dept. of Agriculture—Agricultural Research, Jul. 1994.

©1994 Meredith Corporation—Successful Farming, May 1994.

©1993 Meredith Corporation—Successful Farming, Dec. 1993.

Farm Journal, Jan. 1996.

*Primary Examiner*—Terry Lee Melius
*Assistant Examiner*—Christopher J. Novosad
*Attorney, Agent, or Firm*—Dressler, Rockey, Milnamow & Katz, Ltd.

[57] ABSTRACT

This corn harvesting row unit, which can be assembled into a corn header capable of efficiently harvesting individual rows of corn regardless of the row width. This improvement or novel structure is configured to reduce the number of moving parts required for the efficient harvesting of corn and in addition reduces the power requirements. This novel corn unit will assemble as a corn head with any number of rows and wherein each row unit is capable of harvesting, individually the planted row assigned to it. This novel corn row unit permits the efficient gathering of narrow row, larger spacing corn populations, as well as wider rows and closer spacing populations. Efficient harvesting of narrow row corn has not been possible prior to this invention which is universal in that it can handle any row width.

34 Claims, 4 Drawing Sheets

UNIVERSAL CORN PICKING ROW UNIT

BACKGROUND OF THE INVENTION

1) Field of the Invention

This invention relates to corn harvesting machinery specifically the header containing a plurality of row units to strip the ears from the stalk and feed the ears to the combine for shelling. The improvement of this invention being in the row unit as attached to a frame to form the header.

2) Related Art

There has been a plurality of variations of adjustable width corn heads for use with combines and some of these corn heads, with adjustable row units, have been in existence for approximately 25 years. The original corn head for use with a combine was with fixed spacing between the row units and this design was embodied in U.S. Reissued Pat. No. 27,554, which was originally issued in 1966. Subsequently, it was determined that a corn head in which the width between the row units could be varied to match the various width of corn planted rows was desirable. Several embodiments of this variable row width corn head were and are still marketed. These corn heads are described in U.S. Pat. No. 3,520,121 patented Jul. 14, 1970, one of the early corn heads which permitted the modification of row widths in the field.

During the past 25 to 30 years since the introduction of the variable row width planters and corn heads, much research and development has occurred in the agronomics of the growing of corn. This research has concentrated on reaching the maximum population by varying row widths and spacing between plants. The original corn head and row units were and are capable of harvesting row widths between 28 and 40 inches. The row units were designed to harvest a single row, but because the row units cannot be placed close enough together for each unit to have its own row, in narrow row corn, two rows of corn are force into a single row unit when narrow rows are harvested. Such usage and forcing of the two rows of corn into a row unit designed for one row deteriorates the efficiency of the corn row unit, which was designed to harvest a single row efficiently.

Recently, 12–15 inch rows of corn with varied spacing have been studied for yields and other agronomic affects. Such row narrow widths provide improved erosion control, higher population, higher yield, and better weed control. The narrow rows require less chemical use and in some cases utilizes only one-half of much weed control. All of these factors benefit the environment.

BRIEF SUMMARY OF THE INVENTION

This invention provides a row unit, any number of which can be assembled on a frame as a header for harvesting corn. This invention provides for a corn head which will be able to harvest any row width of corn individually row-by-row which currently can be planted. This row unit is also movable on the frame to various row widths in the field. An advantage of this row unit is to assemble a header to harvest the narrowest row spacing, which has been proven agronomically feasible. The header will also harvest effectively and efficiently the widest row widths.

By utilizing one gathering chain or gatherer unit chain for each row, the harvesting row unit is reduced in width and weight, and thus will permit the placing of a sufficient number of row units together to harvest narrow row corn. Another advantage to this invention is the fact that it provides means for changing the elevating mechanism to accommodate various size ears. Another improvement provided by this invention is that reduced power requirements as a driven mechanism is replaced by stationary material. This permits the reduction of power required to operate the row unit, as well as reducing the number of gears within the gear box. Reducing the number of gears and the power requirements also allows reduction in the size of the gear box, which permits the reduction in row widths. This means narrower rows can be efficiently harvested by utilizing the novel corn row unit of this invention.

DETAILED DESCRIPTION OF THE INVENTION

Figure 3:
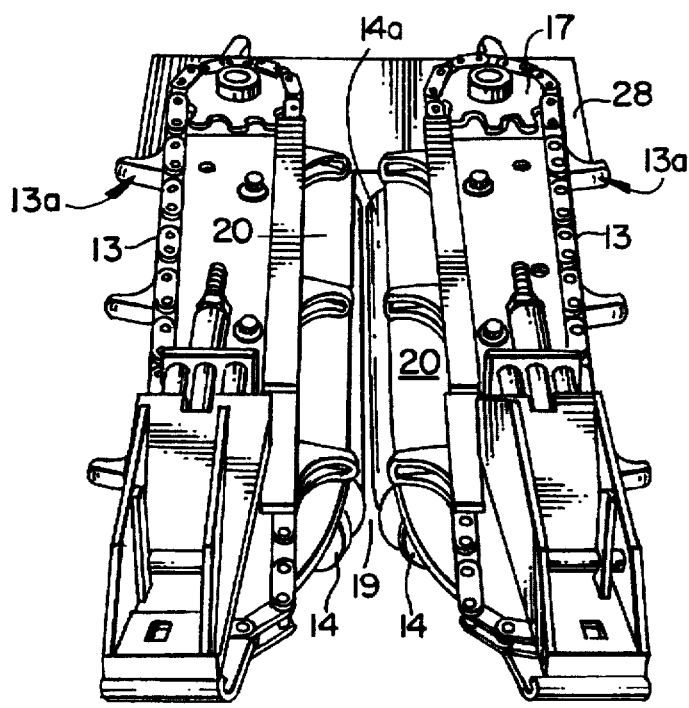
FIG. 3 is a top view of a prior art corn head row unit.

The operation of the row unit of this invention is similar to that of the operation of the row unit of corn heads of the prior art as illustrated in FIG. 3. In FIG. 3 and in the present invention the corn stalks are engaged by the gathering chain 13 or chains as in the prior art and guided into the snapping slots 19 formed by snapping rolls 14. The snapping rolls 14 pull the corn stalks through the snapping slots 19 and the ears are removed from the stalks as they come into engagement with the stripper plates 20. The ears are then carried rearwardly by the gathering chain fingers 13a and deposited in the trough 12 with the auger 12a.

Figure 4:
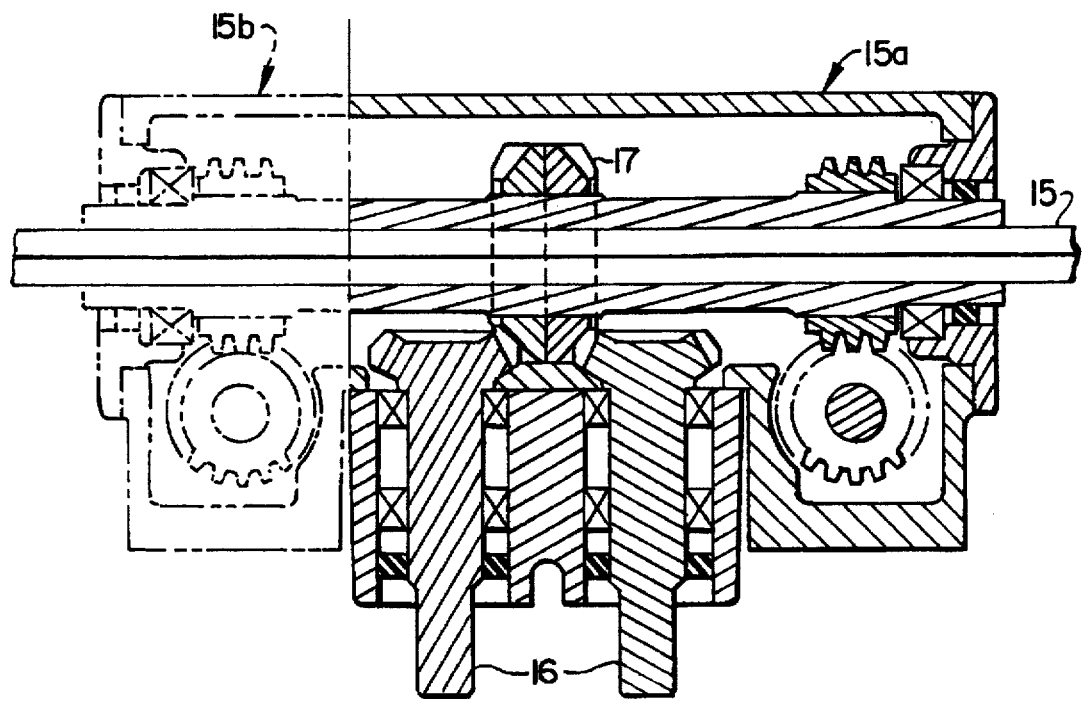
FIG. 4 is a sectional view of a gear box showing the prior art and the present invention.

The power to drive the gatherer chains 13 and the stripper or snapping rolls 14 is provided from a main drive shaft 15 through a gear box 15a. The gear box 15a, as illustrated in FIG. 4, is but one example of gear boxes which might be utilized to drive the present invention. As shown in FIG. 4, part 15b would be eliminated as not necessary in this invention but was necessary in the prior art. Other gear boxes and other drive methods are illustrated in various U.S. patents and any could be modified to be utilized with the present invention. These include the drive means shown in U.S. Pat. No. 3,462,928 issued to L. D. Schreiner, et al. Aug. 26, 1968 and U.S. Pat. No. 3,599,409 issued to Martin J. Whitney, et al. Aug. 17, 1971. These corn row units of the prior art form the background for the improvement of this invention.

Figure 1:
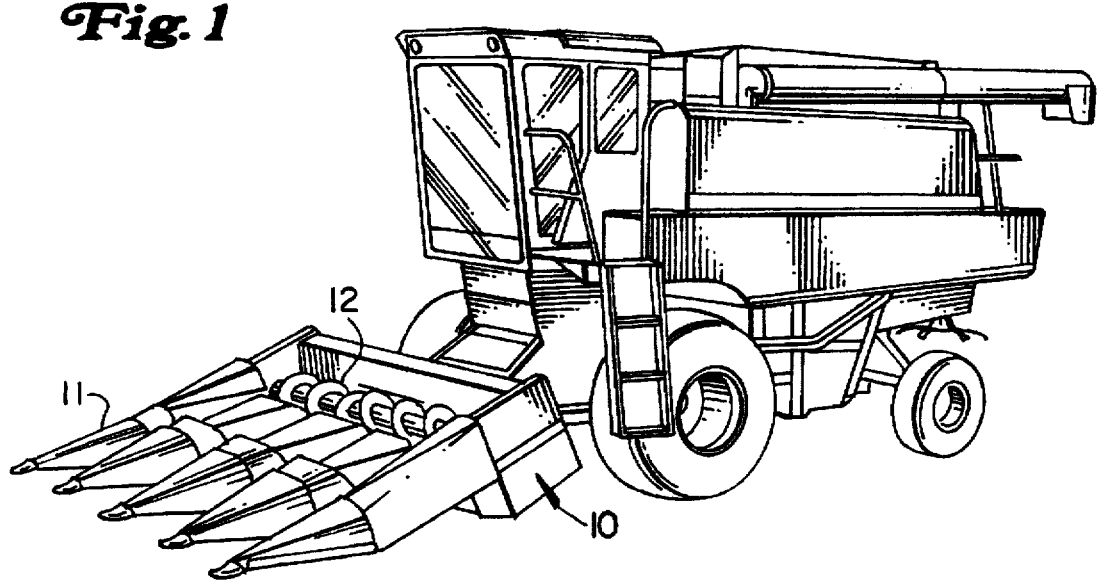
FIG. 1 is a plan view of a combine with a corn head attached.
Figure 2:
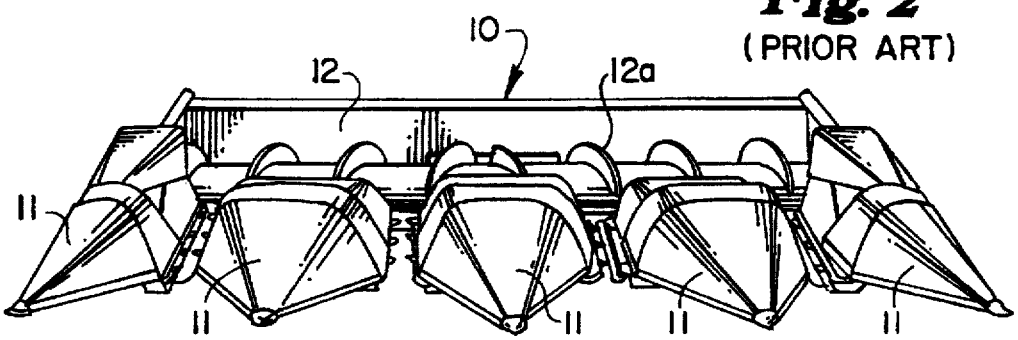
FIG. 2 is a front view of a prior art corn head.
Figure 5:
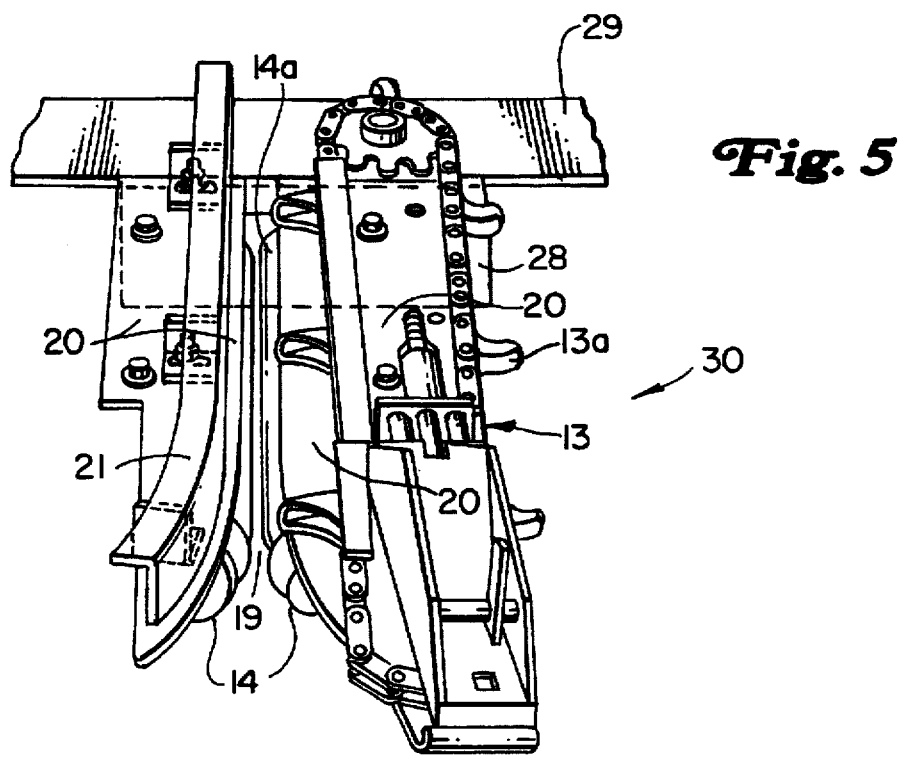
FIG. 5 is a top view of a row unit of the present invention.

As shown in FIG. 5, this invention has a single gatherer chain unit 13, including a plurality of gatherer chain fingers 13a attached to the chain unit 13. The row unit is attached to a main frame 29 by a plurality of fastening means not shown but would be as provided in the prior art. The corn unit of this invention would also include a plurality of shields 11, and the header would have auger 12a to move the corn to the center and into the combine as shown in FIG. 2.

Figure 6:
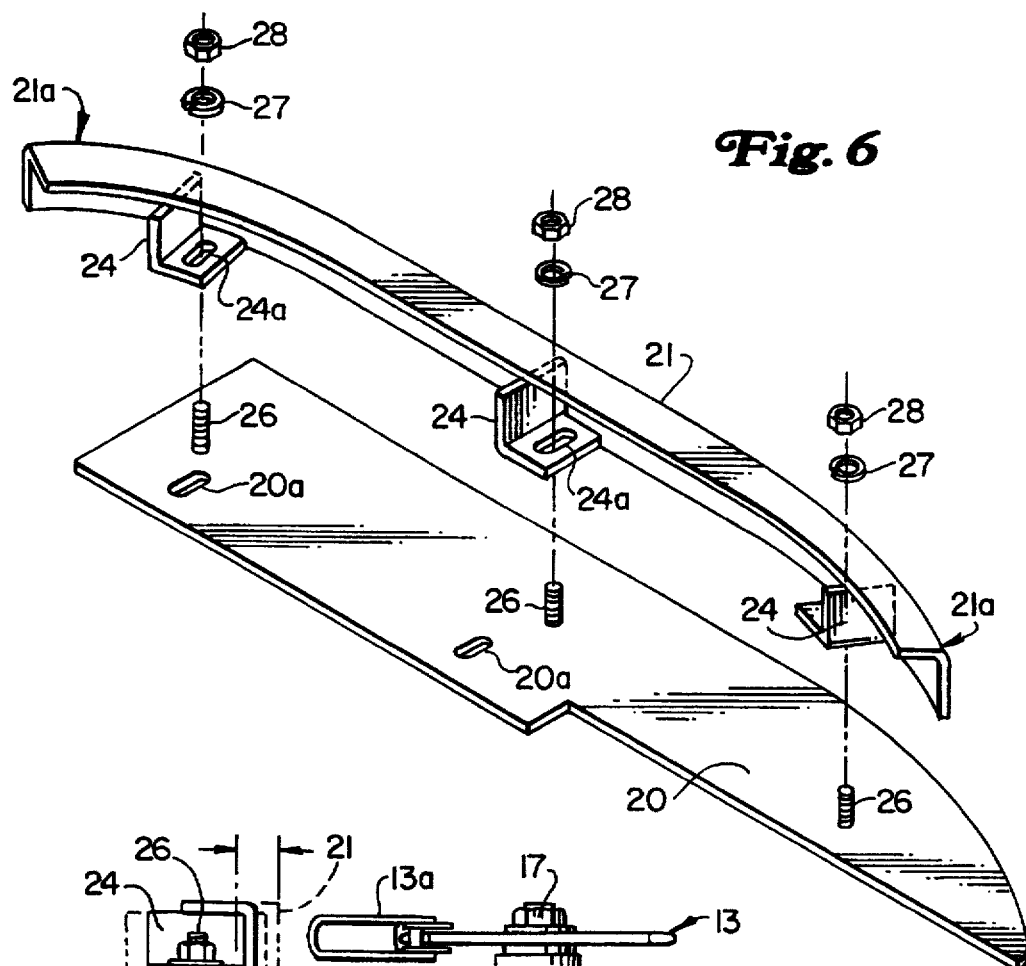
FIG. 6 is an exploded view of the ear guide of the present invention.

The stripper rolls 14, including the stripper knife sections 14a, are similar to the stripper stalk rolls as shown in the prior art. The stripper plates 20 perform the same function as the prior art. The ears of corn being separated from the stalks by the stalk rolls 14 and the stripper plates or shields 20 are now carried by the gatherer fingers 13a upward and into the auger 12a. The ears are not moved by opposite fingers but are confined on one side by the ear guide 21. Ear guide 21 is attached to the stripper shield 20 and is made adjustable with respect to the stripper shield by use of slots 24a as shown in FIG. 6. Stripper shield 20 is held to the frame by any well-known fastening means, such as bolts and nuts not shown, and is also adjustable by use of slot 20a.

Figure 7:
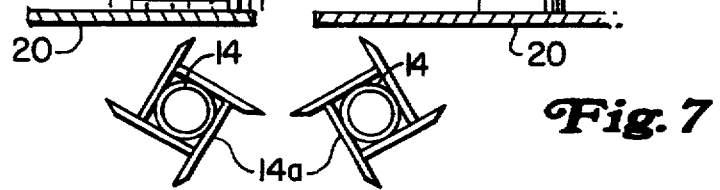
FIG. 7 is a front view of the row unit of the present invention with one gatherer chain.

FIG. 7 illustrates the end view showing the adjustability of the ear guide 21 in a horizontal manner with respect to the gatherer chain 13 and the fingers 13a on said gatherer chain 13.

Figure 8:
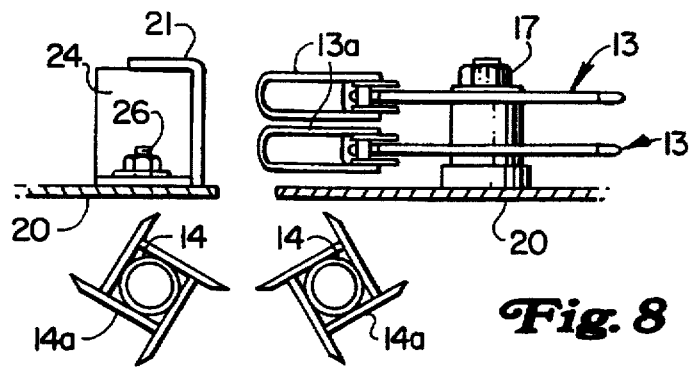
FIG. 8 is a front view of the row unit with two gatherer chains.

FIG. 8 illustrates an embodiment with two gatherer chains 13 both being driven by the same drive and one placed vertically above the other. This modification, enlargement of the original fingers, might be necessary if the corn head row unit of this invention were utilized in harvesting heavy row yield corn such as occurs in row widths near the maximum row widths planted. The additional gatherer chain fingers 13a and the additional height of the ear guide 21 will contain and move more corn per row unit. Heavy row yield is the result of the wider width rows and the closer placement of the seeds to obtain maximum population. Thus, this novel row unit on a header can individually harvest narrow rows and can harvest the widest row widths with normal and reduced power.

Figure 9:
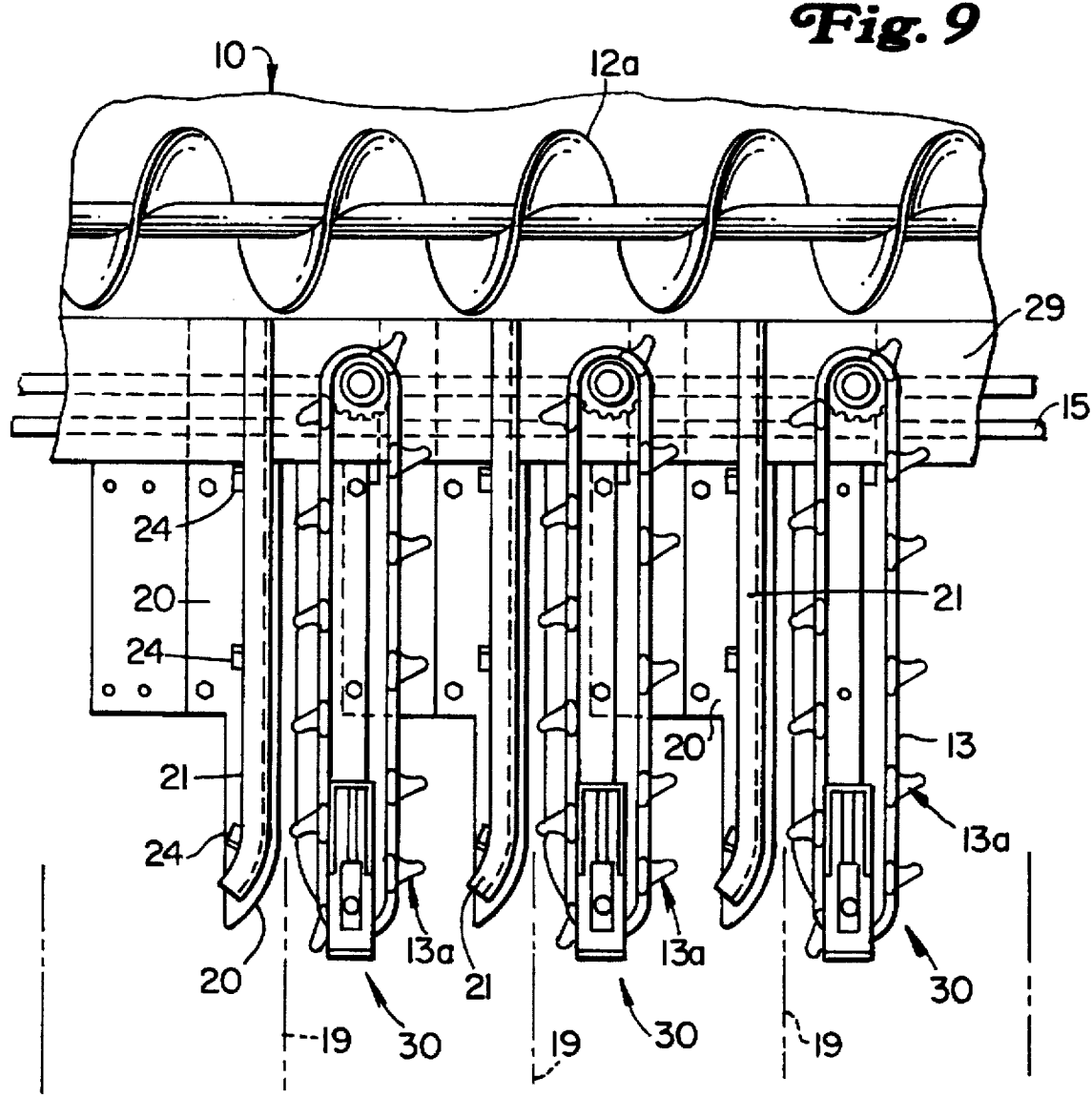
FIG. 9 is a top view of assembly of a plurality of row units of the present invention.

FIG. 9 shows a top view of a plurality of the row units 30 of this invention mounted to the main frame 29 and showing the auger 12a of the header 10 and main drive shaft 15. This illustrates the assembly of a plurality of row units of this invention for harvesting individual corn rows planted at narrow widths.

The auger 12a carriers the corn to the center of the corn head for discharge and as a result for efficiently discharge into the auger 12a right-hand and left-hand units are necessary. The right-hand gatherer chains with fingers 13a, as shown in FIG. 5, will be on the right-hand side of the corn head and the left-hand chains 13a will be on the left-hand side of the corn head 10 as the combine proceeds forward. This is to ensure the corn is fed in by the gatherer chain fingers 13a and the ear guide 21 to flow with the direction of travel of the auger 12a. The curve 21a, shown in FIG. 6, is duplicated at both ends of the ear guide 21, and thus make the ear guides 21 interchangeable for the right- or left-hand units. The larger vertical ear guide 21, shown in FIG. 8, can also be made adjustable in a similar manner to the ear guide 21 shown in FIG. 7.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appended claims.

What is claimed is:

1. A row unit for a row crop harvester attachment for mounting on a mobile unit:
    a) a main frame on said attachment;
    b) a frame for said row unit attached to one side of said main frame;
    c) a power source attached to said frame;
    d) a plurality of stripper rolls connected to said power source;
    e) first and second stripper plates cooperating with said stripper rolls to remove ears from stalks as the stalks pass through said stripper rolls;
    f) a gatherer chain having a plurality of fingers;
    g) said gatherer chain connected to said power source and attached to said first one of said stripper plates to move said chain relative to said stripper plate; and
    h) an ear guide attached to said second one of said stripper plates adjacent said fingers of said gatherer chain to contain the ears within said fingers, whereby the ears are moved to a collection device.

2. The invention in accordance with claim 1, wherein said moving gathering chain cooperates with said first one of said stripper plates for movement of said ears.

3. The invention in accordance with claim 1, wherein said fingers move linearly with relationship to said ear guide.

4. The invention in accordance with claim 1, wherein said ear guide is attached to said second one of said stripper plates with an adjustable coupling, whereby said ear guide is adjustable with respect to its spacial relationship with said fingers.

5. The invention in accordance with claim 1, wherein said stripper plates are attached to said frame with an adjustable coupling, whereby said stripper plates are adjustable with respect to the spacing between each other.

6. The invention in accordance with claim 1, wherein a second gatherer chain is spaced vertically above said first gatherer chain and said first stripper plate and driven with said first gatherer chain.

7. The invention in accordance with claim 1, wherein said ear guide is curved at both ends to direct the flow of material.

8. The invention in accordance with claim 1, wherein said power source includes a gear box having an input of power from a main power source, said power output from said gear box delivered to said stripper rolls and said gatherer chain.

9. The invention in accordance with claim 8, wherein said power output from said gear box is individually delivered to said stripper rolls and said gatherer chain drives.

10. A multiple-row head for harvesting crops including a stalk and a harvestable portion connected to the stalk, the head comprising:
    a frame;
    a collector supported relative to the frame; and
    a plurality of row units mounted on the frame, each row unit having a channel with a front inlet adapted to receive an individual row of crop as the head advances over a field of crop planted in spaced apart rows, wherein each row unit further comprises:
        a stripper configured to strip the harvestable portion of the crop from the respective stalks;
        a gatherer associated with a first side of the channel and configured to convey the harvestable portion of the crop to the collector; and
        a guide associated with a second side of the channel and configured to contain the harvestable portion of the crop between the gatherer and the guide.

11. The multiple-row head of claim 10 wherein the channels of adjacent row units are substantially parallel with each other.

12. The multiple-row head of claim 10 wherein the inlets of adjacent row units are laterally spaced a distance of 15 inches apart relative to the direction of travel.

13. The multiple-row head of claim 10 wherein the row units are mounted on the frame with adjustable fasteners, whereby the inlets of adjacent row units are laterally spaced an adjustable distance apart relative to the direction of travel.

14. The multiple-row head of claim 13 wherein each row unit is selectively mounted on the frame at one of a plurality of locations substantially equidistant from each other.

15. The multiple-row head of claim 10 wherein said gatherer comprises a chain coupled to a plurality of fingers.

16. The multiple-row head of claim 15 wherein the fingers move linearly in relation to the guide.

17. The multiple-row head of claim 15 wherein the stripper comprises a first stripper plate and a second stripper plate associated with the first and the second sides of the channel, respectively, and the guide is attached to the second stripper plate with an adjustable coupling, whereby the guide and the fingers are spaced an adjustable distance apart.

18. The multiple-row head of claim 10 further comprising another gatherer located above the gatherer, both gatherers being driven by a common source.

19. The multiple-row head of claim 10 wherein the stripper comprises:
 a first stripper plate associated with the first side of the channel;
 a second stripper plate associated with the second side of the channel; and
 a plurality of snapper rolls cooperating with the stripper plates to strip the harvestable portion of the crop from the respective stalks as the crop passes through the snapper rolls.

20. The multiple-row head of claim 19 wherein the second stripper plate is attached to the frame with an adjustable coupling, whereby the first stripper plate and the second stripper plate are spaced an adjustable distance apart.

21. The multiple-row head of claim 19 wherein the gatherer is coupled to the first stripper plate and the guide is coupled to the second stripper plate, and the gatherer and the guide cooperate with at least one of the stripper plates to convey the harvesting portion of the crop to the collector.

22. The multiple-row head of claim 19 further comprising a gear configured to transfer power from a power source to the gatherer and to the snapper rolls.

23. The multiple-row head of claim 22 wherein the power is transferred individually to the gatherer and to each snapper roll.

24. The multiple-row head of claim 10 wherein the guide is curved at both ends, whereby the guide is interchangeable between right-hand and left-hand row units.

25. The multiple-row head of claim 10 wherein the gatherers of adjacent row units are separated from one another by the guide of at least one of the row units.

26. The multiple-row head of claim 10 wherein the gatherer of at least one row unit mounted on the right-hand side of the head is associated with the right-hand side of the channel, and the gatherer of at least one row unit mounted on the left-hand side of the head is associated with the left-hand side of the channel.

27. The multiple-row head of claim 10 wherein the inlets of adjacent row units are laterally spaced a distance less than 15 inches apart relative to the direction of travel.

28. A multiple-row crop harvester attachment for mounting on an agricultural vehicle including a power source, the attachment comprising:
 a frame having a front end and a rear end;
 a collector coupled to the rear end of the frame;
 a transmission coupled to the power source; and
 a plurality of row units coupled to the front end of the frame, each row unit having a channel with first and second sides, with a front inlet adapted to receive an individual row of crop as the vehicle travels over a field of crop planted in spaced apart rows, wherein each row unit further comprises:
 a stripper mechanism including a snapper mechanism associated with said row unit to strip a harvested portion of the crop received through the inlet of the channel from a stalk portion of the crop;
 a gatherer coupled to the transmission for receiving power from the power source, the gatherer associated with the first side of the channel and having a plurality of fingers configured to convey the harvested portion of the crop to the collector; and
 a guide associated with the second side of the channel and configured to contain the harvested portion of the crop between the gatherer and the guide.

29. The attachment of claim 28 wherein the gatherers of adjacent row units are separated from each other by the guide of at least one of the row units.

30. The attachment of claim 28 wherein the inlets of adjacent row units are spaced a distance of 15 inches apart.

31. The attachment of claim 28 wherein the row units are mounted on the frame with adjustable fasteners, whereby an operator may adjust the attachment for harvesting rows of crop planted in rows spaced apart by different predetermined widths.

32. The attachment of claim 28 wherein the inlets of adjacent row units are spaced a distance less than 15 inches apart.

33. A row unit for a multiple-row head for harvesting crops including a stalk and a harvestable portion connected to the stalk, the head comprising a frame, a collector supported relative to the frame, and a plurality of row units mounted on the frame, each row unit having a channel with a front inlet adapted to receive an individual row of crop planted in spaced apart rows, the row unit comprising:
 a stripper configured to strip the harvestable portion of the crop rom the respective stalks;
 a gatherer associated with a first side of the channel and configured to convey the harvestable portion of the crop to the collector; and
 a guide associated with a second side of the channel and configured to contain the harvestable portion of the crop between the gatherer and the guide.

34. A multiple-row head for harvesting crops including a stalk and a harvestable portion connected to the stalk, the head comprising:
 a frame;
 a collector supported relative to the frame; and
 a plurality of row units mounted on the frame, each row unit having a channel with a front inlet adapted to receive an individual row of crop as the head advances over a field of crop planted in spaced apart rows, wherein each row unit further comprises:
 a stalk puller which pulls the respective stalks through the channel to strip the harvestable portion from the stalk;
 a gatherer associated with a first side of the channel and configured to convey the harvestable portion of the crop to the collector; and
 a guide associated with a second side of the channel and configured to contain the harvestable portion of the crop between the gatherer and the guide.

* * * * *